United States Patent [19]

Rosenberg

[11] 3,902,306

[45] Sept. 2, 1975

[54] APPARATUS FOR PICKING FRUIT GROWING ON TREES

[76] Inventor: Baruch Rosenberg, 4 Hadekalim St., Hod Hasharon, Israel

[22] Filed: Mar. 22, 1974

[21] Appl. No.: 453,763

[30] Foreign Application Priority Data

Apr. 4, 1973 Israel.................................... 41947

[52] U.S. Cl. .............................................. 56/333
[51] Int. Cl.² ........................................ A01D 46/24
[58] Field of Search .............................. 56/332–340

[56] References Cited
UNITED STATES PATENTS

| 182,607 | 9/1876 | Ruckel .................................. 56/334 |
| 363,437 | 5/1887 | Thompson ........................... 56/333 |
| 515,852 | 3/1894 | Armstrong ........................... 56/333 |
| 1,257,791 | 2/1918 | Bigger .................................. 56/333 |
| 2,475,687 | 7/1949 | Baker .................................... 56/333 |
| 3,143,844 | 8/1964 | Polk, Jr. ............................. 56/328 R |
| 3,646,741 | 3/1972 | Edwards et al. .................. 56/328 R |

Primary Examiner—Russell R. Kinsey
Attorney, Agent, or Firm—Browdy and Neimark

[57] ABSTRACT

A cutter head for picking fruit growing on a tree comprises a pair of overlying members each having at least one mutually matching aperture therein and relatively movable from a first position, at which the apertures are in alignment for effecting entry of a piece of fruit, to a second position at which the apertures are misaligned. Means are provided to move the members from their first position to their second position for capturing the stem of the fruit. A support is mounted on the head and is selectively upwardly movable into engagement with the underside of a piece of fruit for selective lifting the fruit. Finally, operator means are provided responsive to movement of the members from their first to their second position for imparting upward movement to the support.

10 Claims, 9 Drawing Figures

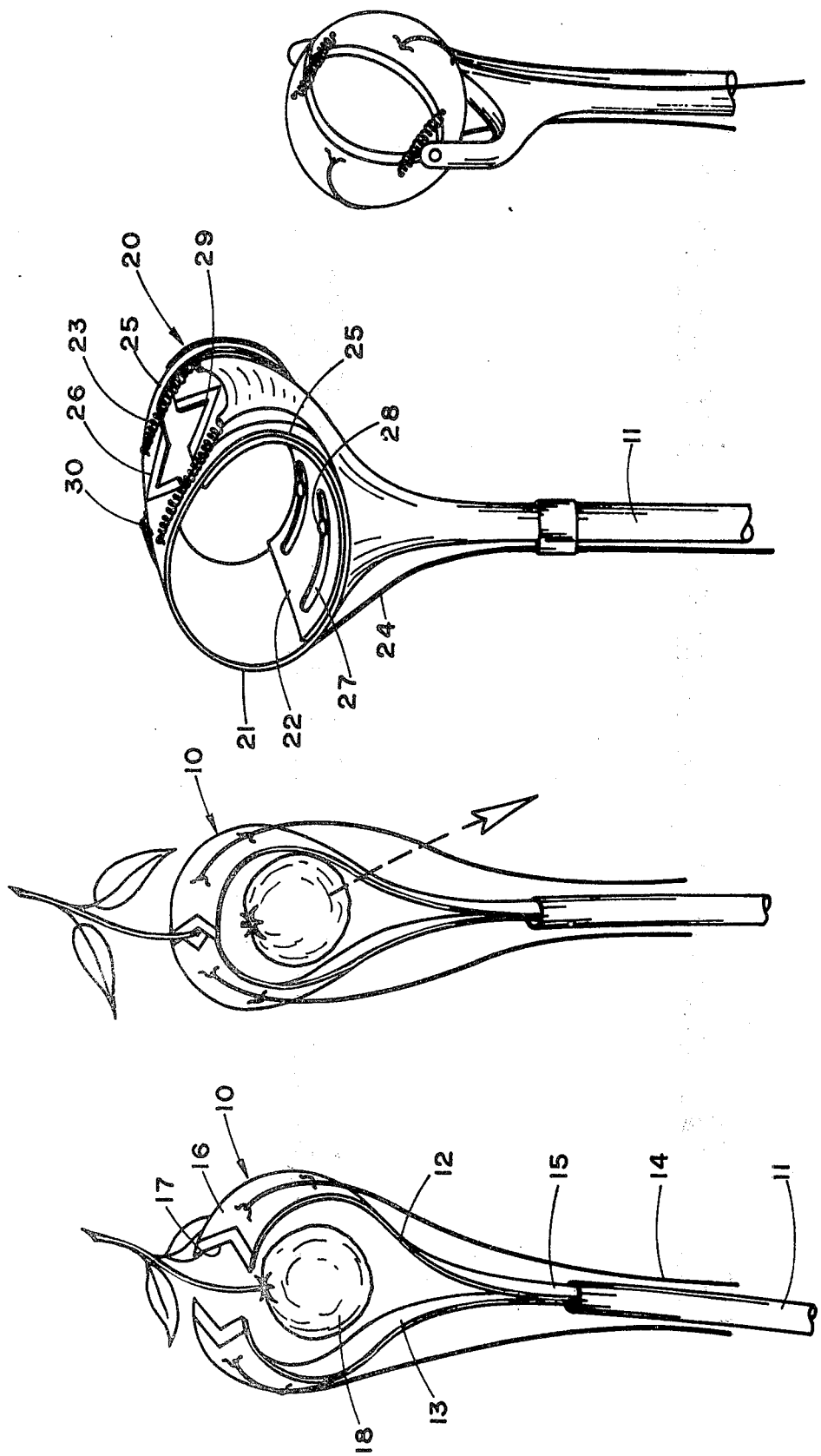

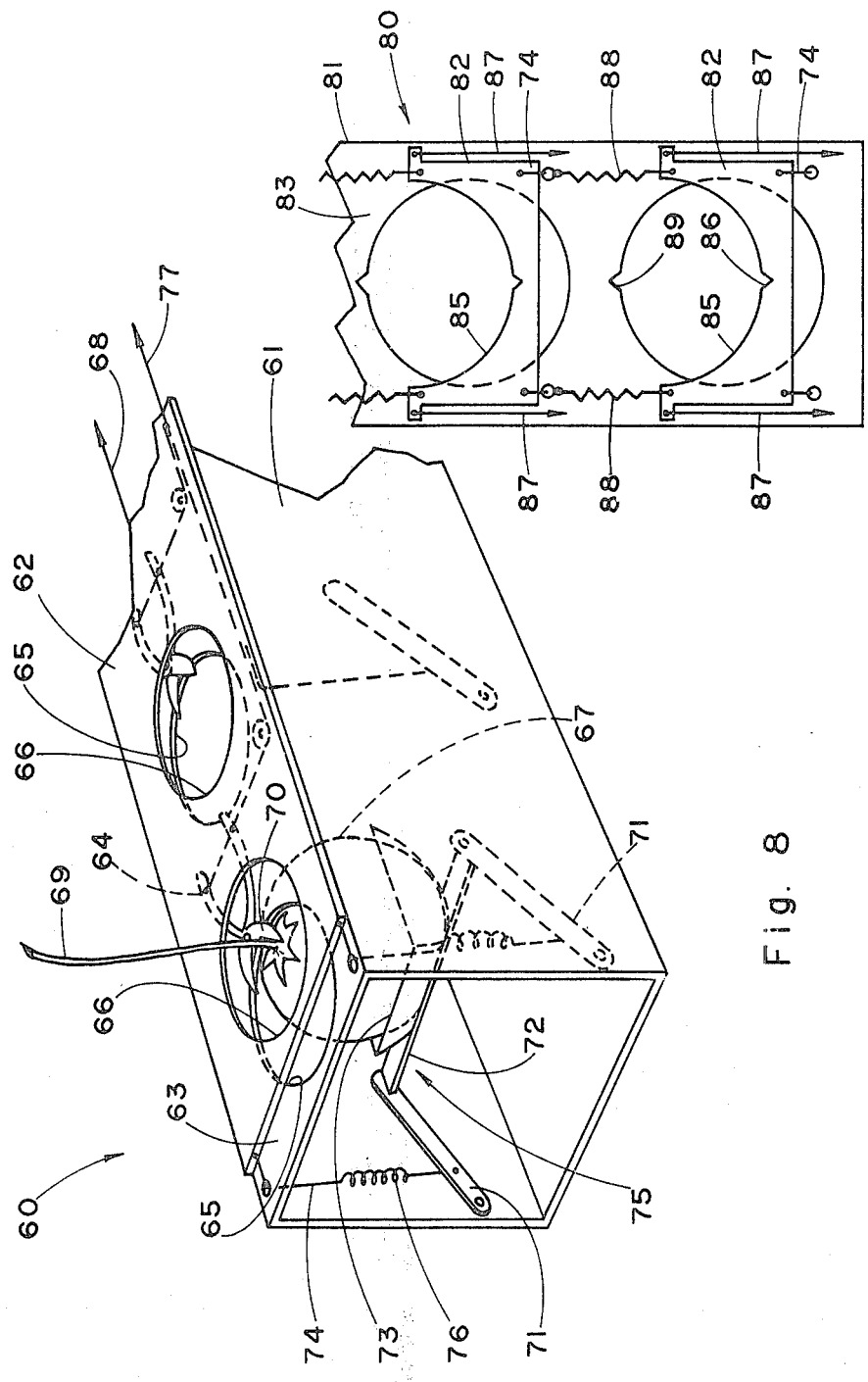

APPARATUS FOR PICKING FRUIT GROWING ON TREES

This invention relates to apparatus for picking fruit growing on trees, and more particularly to apparatus that facilitates severing the stem at a point close to its attachment to the body of the fruit.

It is well known that there are many advantages that arise by reason of picking fruit from trees such that the stem is severed adjacent the body of the fruit. In order to achieve this result, it has been the practice heretofore, to pick fruit piece-by-piece, by manually severing the stem of a piece of fruit either by twisting it between the fingers of opposite hands, or cutting it with a special cutter designed to permit the cutter blade to be positioned close to the body of the fruit. This approach permits picking only that fruit which can be reached by hand from the ground or from special ladders leaving fruit not easily accessible remaining on the trees. As a consequence of the manual work involved, the harvesting of fruit is a tedious, time-consuming and expensive operation in terms of the labour involved, as well as in terms of crop damage arising from improper picking techniques.

It is therefore an object of the present invention to provide a new and improved apparatus for picking fruit growing on trees which will facilitate the picking process and reduce crop damage by reason of improper picking techniques.

According to the present invention there is provided a cutter head for picking fruit growing on a tree comprising: a pair of overlying members each having at least one mutually matching aperture therein and relatively movable from a first position, at which the apertures are in alignment for effecting entry of a piece of fruit, to a second position at which the apertures are misaligned; means for moving the members from their first position to their second position for capturing the stem of the fruit; a support mounted on the head and selectively upwardly movable into engagement with the underside of a piece of fruit for selective lifting the fruit; and operator means responsive to movement of the members from their first to their second position for imparting upward movement to the support.

Preferably the jaws are in the form of a pair of nested cylindrical members mounted for relative rotary movement about the axes of the members. In this embodiment, separate springs are required, but the shape of the members facilitate the fabrication. Moreover, this arrangement permits the incorporation into the cutter head of a cradle mounted on the members for engagement with a piece of fruit when the latter is contained with the members when they are in their first position, and means responsive to movement to their second position for raising the cradle thereby raising the fruit into contact with the inside of the members to permit the stem to be cut close to the body of the fruit.

Embodiments of the invention are illustrated by way of example in the accompanying drawings, wherein:

FIG. 1 is a perspective view of the first embodiment of the invention with the jaws shown in their open position;

FIG. 2 is a perspective view of the embodiment shown in FIG. 1 but showing the jaws in their closed position;

FIG. 3 is a perspective view of the second embodiment of the invention with the jaws shown in their open position;

FIG. 7 is a perspective view of the third embodiment of the invention which is similar to that shown in FIGS. 1 and 2.

FIG. 8 is a perspective view of a further embodiment of the invention; and

FIG. 9 is a top view of a modification of the embodiment shown in FIG. 8.

Figure 6:
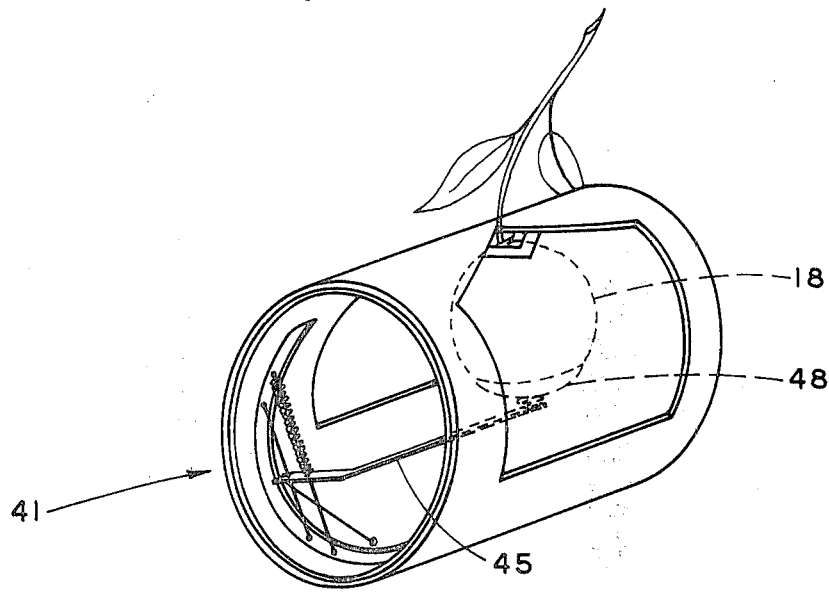
FIG. 6 is a perspective view of a version of the second embodiment of the invention.

Referring now to FIG. 1, reference numeral 10 designates a first embodiment of a cutter according to the present invention supported on one end of an elongated rod 11 constructed of wood or metal tubing of a size suitable for being grasped in the hands of a person picking fruit. Cutter head 10 comprises a pair of jaws 12 and 13, and manually operable means 14 for moving the jaws. Each jaw is in the form of an identical leaf spring having one end 15 small enough to fit in or around the rod 11 and a free end 16 that is curved into a portion of a circle and is provided with a V-shaped notch 17 that is sharpened for the purpose of forming a cutting edge.

In their normal, flexed condition, the jaws occupying a first position at which the free ends 17 are displaced one from the other and define an opening large enough to receive a piece of fruit 18 growing on a tree. The natural resiliency of the leaves 12 and 13 constitute spring means for urging the leaves toward a second position shown in FIG. 2 at which the free ends 17 overlie each other.

The manually operable means 14 are in the form of a pair of flexible cables one end of which is connected to the respective leaf springs. These flexible cables are connected to an actuator member (not shown) mounted on the rod and accessible by the user for the purpose of spreading the leaf springs and moving them to their first position.

In operation, the user would operate the actuating means to move the flexible cables 14 to a position that would spread the leaf springs to their first position. Preferably, a manually releasable detent would be employed to releasably maintain the jaws in their first position against the natural resiliency of the jaws to close. The user would then move the head 10 into a tree bearing fruit until a piece of fruit would be located within the jaws 12 and 13 as shown in FIG. 1 one of these jaws can have a curved top surface with circular apertures therein. Thereafter, the release of the detent would release the flexible cables 14 permitting the natural resiliency of the jaws 12 and 13 to move the free ends 17 toward each other to the position shown in FIG. 2 thereby severing the stem of the fruit. The severed fruit would then fall either into a chute attached to the head 10 or fall freely to the ground.

Referring now to FIG. 3, reference numeral 20 designates another embodiment of the cutter head according to the present invention also shown supported on one end of an elongated rod 11. Cutter head 20 comprises a pair of nested members 21 and 22, spring means 23 and manually operable means 24. Member 22 is semicircular in cross-section and is fixedly secured to the rod 11 such that the member opens essentially upwardly and to one side as indicated in FIG. 3. Member 21 is rotatably journalled on the exterior of member 22 and is circular in cross-section having a pair of side straps 25 extending from a V-shaped notch 26 which constitutes a cutting edge. Member 22 is provided with a pair of slots 27 each for receiving a pin 28 which is attached to the member 21 for effecting limited angular rotation of member 21 relative to member 22. The free end of member 22 adjacent to the notch 26 is provided with a similarly shaped notch 29 aligned with notch 26.

One end of each spring 23 is attached to the movable member 21 and the opposite end of the spring is connected to the fixed member 22. In this manner, the movable member is resiliently urged from a first position at which the notches are spaced apart a distance large enough to effect entry therebetween of a piece of fruit, to a second position at which the notches are in overlying relationship such that a stem captured between the V-shaped notches is severed.

The manually operable means 24 is in the form of a flexible cable attached at 30 to the movable member 21 and operated by manually actuable means (not shown) so as to permit the movable member 21 to be moved to its first position by an operator grasping rod 11. With the movable member in its first position, a user may manoeuvre the rod 11 into a tree bearing fruit and capture a piece of fruit in the opening between the members after which the actuating means may be released. The flexible cable 24 then becomes slack, effecting the operation of springs 23 which drive the movable member from its first to its second position thus severing the stem of a piece of fruit. The severed fruit may be caught in a chute and guided into a receptacle or it may drop freely.

Figure 4:
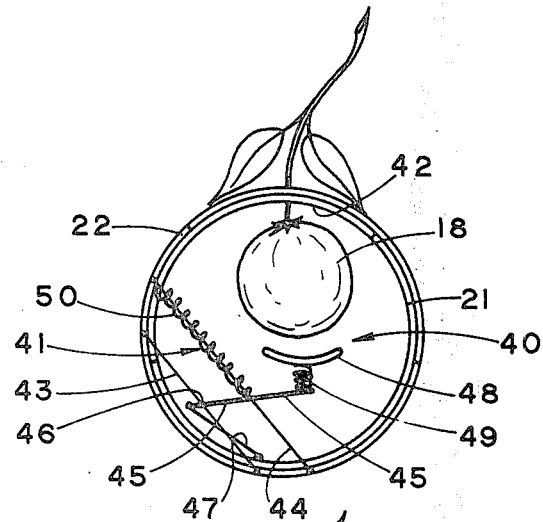
FIG. 4 is a side schematic view of an embodiment of the invention illustrating the cradle in its lowermost position.
Figure 5:
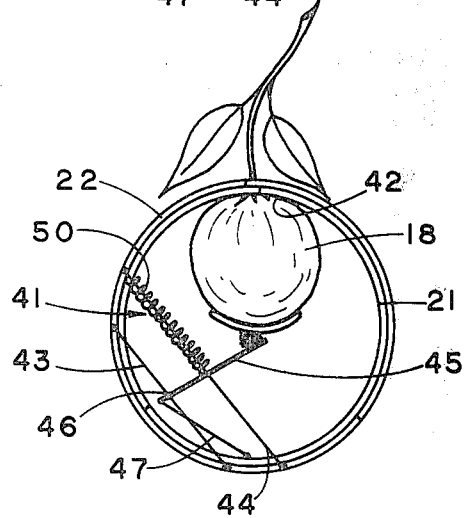
FIG. 5 is a view similar to FIG. 4 but showing the cradle in its uppermost position in response to the movement of the jaws to their closing position.

In order to ensure that the stem will be severed close to the body of the fruit, the arrangement as shown in FIGS. 4 and 5 may be utilized. As shown in FIG. 4, a cradle 40 is mounted on the members in their first position as shown in FIG. 4. Means 41 is also mounted within the members and is responsive to their movement to their second position for raising the cradle 40 which raises fruit 18 into contact with the inside surface 42 of the members such that the stem can be cut close to the body of the fruit.

Means 41 comprise a pair of rods 43 and 44 rigidly secured to the fixed member 22 in spaced parallel relationship, a lever arm 45 pivoted at 46 to rod 43, an operating cable 47 connecting one end of lever 45 to the movable member 21, and a cup-shaped support 48 which is mounted on a spring 49 to the free end of lever 45. Spring 50 coiled around rod 44 is engageable by lever 45 to urge the same toward its normal position when the members 21 and 22 are in their first position and the head is capable of receiving a piece of fruit 18 between the V-shaped notches. After a piece of fruit has been captured, as indicated in FIG. 4, and the operator releases flexible cable 24 so that the movable member is driven by springs 23 toward its second position, the linkages of means 41 will cause the lever 45 to pivot just as the V-shaped notches begin to overlap causing the cup-shaped member 48 to engage the bottom of fruit 18 raising the same into engagement with the inner surface 42 of the members. Thus, final movement of the movable member to its second position is accompanied by the raising of the fruit 18 such that the stem is severed close to the base of the fruit. The precise moment in the sequence of events in which the raising of the cup-shaped member 48 occurs is determined by the lever arms of lever 45 and the location of the point at which cable 47 is connected to the movable member. These parameters may be adjusted to establish the optimum point at which raising the fruit and severing the stem occur.

The cylindrical members 21 and 22 may have shapes other than that shown in the drawings and in fact may be continuous cylinders each of which is provided with cut-out portions with V-shaped notches in one end.

On the other hand, the cylindrical members may be semi-cylindrical, in which case, the strips 25 shown in FIG. 3 would be eliminated. While springs 23 could be maintained in their position shown in FIG. 3 extending between the free edges of the semi-cylinders, it is preferred to locate the springs on the bottom of the semi-cylinders adjacent slots 27. In particular, one end of a spring could be attached to pin 28 and the other end to cylinder 22 adjacent or within a slot.

As a further modification, each of the members may be in the form of a flat sheet of spring steel or plastic material. In such case, an open frame would be provided with guides in opposite longitudinal edges and a guide roller extending across opposite lateral edges. Each flat sheet, being resilient and flexible, would pass around the rollers and, assisted by the guides, form a half of a movable cover that could be selectively moved toward or away from the other cover to close or open the frame within which a piece of fruit could be captured. Severing of the stem could be achieved by suitable notches in the opposite transverse edges of the sheets.

The embodiment shown in FIG. 6 comprises a pair of jaws that are semi-spherical in shape. These jaws may optionally be provided with notches such that they operate in the manner shown in FIGS. 1–3. The spherical nature of the jaws makes them easy to fabricate by a moulding process and it is possible for the material of these jaws to be a plastic material. Suitable springs are provided for urging the jaws together and a flexible operating cable is provided for selectively opening the jaws against the action of the springs. Release of this cable will permit the springs to snap the jaws shut and sever the stem of a piece of fruit captured within the spherical volume defined by the jaws.

Instead of providing notches for the knife edges that serve to sever the stems, a separate cutter mechanism can be incorporated into each of the embodiments described above. The cutter mechanism, in such case, would be mounted on one of the movable members in such a position that the other of the members would serve to thrust a stem into the open cutter blades of the mechanism as the members close. After closure of the members and the capture of the stem between the cutter blades, a separate manually operable cutter operator on the rod mounting the members would be actuated to close the cutter blades and sever the stem.

In order to expedite fruit picking, a plurality of individual cutter heads could be assembled together as a unit with each head individually mounted in a separate sleeve that is free to move vertically in response to the presence of a piece of fruit contacting the cutter head.

Each head would thus seek a vertical level compatible with the level of the fruit permitting many pieces of fruit to be picked simultaneously.

A still further embodiment of the invention, designated by reference numeral 60 is shown in FIG. 8, and is a multiple head arrangement by which a plurality of pieces of fruit may be picked simultaneously. Head 60, which is mounted on a suitable rod (not shown) by which the head can be lifted into a tree bearing fruit to be picked, comprises an elongated rectangular box 61, which may be metal or extruded plastic, a cover 62 slidingly mounted on the top surface 63 of the box, a plurality of cutter mechanism 64, and a plurality of articulated supports 75.

The top surface 63 of box 61 is provided with a plurality of circular holes 65 large enough to receive the largest piece of fruit to be picked and which cover 62 is slidably mounted for limited translation. Cover 62 is provided with a plurality of circular holes 66 spaced apart to match the spacing of holes 65 so that in one terminal position of the cover, the holes 66 are aligned with the holes 65, to effect the entry of a piece of fruit as indicated by reference numeral 67 in FIG. 8. By manual actuation of a cover operator (not shown) cable 68 is moved to draw cover 62 until the holes 66 are almost completely misaligned with holes 65 causing the stem 69 of a piece of fruit to be drawn in the direction of movement of the cover into the open jaws 70 of the cutter mechanism 64 mounted on the centerline of box 61, either above or below the surface 63.

In order to cause the cutter mechanism to sever the stems of the pieces of fruit so captured, supports 75 are employed. Each support comprises a pair of arms 71 pivotally mounted at one end on opposite side walls of box 61, a connector bar 72 extending between the free ends of the arms and pivotally connected thereto, a catch tray 73 centered on bar 72 for receiving a piece of fruit, and connector cables 74 by which the movement of cover 62 is coupled to arms 71. Springs 76 interposed between the cable 74 and the arm 71 provide a resilient connection that permits movement of cover 62 to raise tray 73, and hence the piece of fruit until the body of the fruit abuts the underside of the cutter mechanism. Alternatively, springs could be interposed between the tray 73 and the box 72, all to the end that cover 62 is free to continue moving after the body of the fruit abuts the cutter mechanism.

When the cover is moved so that holes 66 are completely misaligned with holes 65, stem 69 will be trapped in the apex of the open jaws of cutter 64 between the edges defining holes 65 and 66, while the support 75 will hold the body of the fruit in engagement with the cutter jaws. At this point, actuation of a cutter operator (not shown) will move cable 77 closing the jaws and severing the stem at a point adjacent to the body of the fruit.

Preferably, cover 62 is spring urged to its misaligned position on cover 63. In such case, actuation of the surface operator serves to move cover 62 to a position at which holes 66 are aligned with holes 65 permitting fruit to drop through the aligned holes. Upon deactuation of the cover operator, the spring (not shown) moves cover 62 to misaligned position pushing the stems into the jaws 70 of the cutter mechanisms 64. To better trap a stem in a pair of jaws the edge of the hole 65 at the apex of the jaws may be notched. Alternatively, the cutter mechanisms 64 can be eliminated and co-operating edges of holes 65 and 66 can be used to shear through a stem.

As a further alternative, the cover 62 may be segmented. That is to say, the cover may be in the form of a plurality of separate coverlets as illustrated in FIG. 9 which shows cutter head 80 comprising an elongated box 81, and a plurality of segments 82 slidably mounted on top surface 83 of the box. An articulated support, like support 75, may be associated with each hole 84 in surface 83. Each segment 82 has an arcuate edge 85 matching the curvature of holes 84. Notch 86 in edge 85 provides a recess for capturing a stem of a piece of fruit when independently operable linkages 87 are released allowing springs 88 to move the segments into misalignment with the holes. A stem is sheared by the co-operation of notch 86 in a segment and notch 89 in the top of the box.

For facilitating operation, all of the linkages 87 may be connected together (not shown) so that movement to the connection imparts simultaneous movement to the segments. If an obstruction blocks one or more segmnets, the remaining segments are free to move and thus cut the stems that are properly positioned. By properly locating the connection of link 74 on tube 71 (FIG. 8), each support 75 can be made to move upwardly just as final movement of the segments shears the stems captured in co-operating notches 86, 89. Finally the top surface 83 may be curved to facilitate movement of clustered fruit into the various holes during initial movement of the head in a tree.

I claim:

1. A cutter head for picking fruit growing on a tree comprising: first and second overlying members each having at least one opening therein, said overlying members being relatively movable from a first position, at which said openings are in a first predetermined alignment for effecting entry of a piece of fruit, to a second position at which the apertures are in a second predetermined alignment; first means for moving the members from said first position to said second position for engaging the stem of the fruit; a support mounted on the head and selectively upwardly movable in engagement with the underside of a piece of fruit for selective lifting of the fruit; and second means responsive to movement of the members from said first to said second position for imparting upward movement to the support thereby lifting said fruit such that said members engage said stem at a position spatially separated by a desired distance from said fruit.

2. A cutter head according to claim 1 wherein said overlying members employ a pair of nested members mounted for relative sliding movement about a common axis.

3. A cutter head according to claim 2 also comprising a base member and wherein one of said overlying members is fixed to said base and the other is slidable on said fixed member, and including spring means interconnecting said overlying member and urging said slidable member in one direction, and manually operable means including a flexible cable and attached to said slidable member for moving said slidable member against the action of said spring means.

4. A cutter head according to claim 3 wherein said opening of one of said overlying members comprises a V-shaped notch for receiving and cutting the stem of a piece of fruit.

5. A cutter head according to claim 1 wherein said support includes an arm pivotally mounted on one of said overlying members, a cradle attached to said arm and engageable with the underside of a piece of fruit, and a resilient connection between said second means and said cradle.

6. A cutter head according to claim 5 wherein one of said overlying members has a top surface and said opening therein comprises a circular aperture in said top surface and the other member includes a cover and the opening therein comprises a curved opening matching said circular aperture.

7. A cutter head according to claim 6 wherein said curved opening comprises a circular hole.

8. A cutter head according to claim 6 wherein said curved opening is semicircular.

9. A cutter head according to claim 1 wherein said overlying members each have a plurality of openings therein.

10. A cutter head according to claim 9 wherein one of said overlying members is formed with a curved top surface and such plurality of openings comprise circular apertures.

* * * * *